(12) United States Patent
Mayerle (10) Patent No.: US 7,462,002 B2
(45) Date of Patent: Dec. 9, 2008

(54) OPPOSED INDUCTOR IMPROVEMENTS

(75) Inventor: Dean J Mayerle, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 11/828,648

(22) Filed: Jul. 26, 2007

(65) Prior Publication Data

US 2008/0019781 A1    Jan. 24, 2008

Related U.S. Application Data

(62) Division of application No. 11/456,319, filed on Jul. 20, 2006, now Pat. No. 7,267,161, which is a division of application No. 10/772,821, filed on Feb. 5, 2004, now Pat. No. 7,093,547.

(51) Int. Cl.
*A01C 7/00* (2006.01)

(52) U.S. Cl. .................. 406/120; 221/211; 111/174

(58) Field of Classification Search ......... 111/173–175, 111/170; 221/211; 222/630, 408, 529, 547; 239/650, 654; 406/141, 142, 144, 146, 157, 406/162, 181–183, 122, 123
See application file for complete search history.

(56) References Cited

U.S. PATENT DOCUMENTS

| | | | |
|---|---|---|---|
| 3,596,805 A | 8/1971 | Farmery |
| 4,296,695 A | 10/1981 | Quanbeck |
| 4,474,327 A | 10/1984 | Matson et al. |
| 4,562,968 A | 1/1986 | Widmer et al. |
| 4,779,765 A | 10/1988 | Neumeyer |
| 5,161,473 A | 11/1992 | Landphair et al. |
| 5,189,965 A | 3/1993 | Hobbs et al. |
| 5,379,706 A | 1/1995 | Gage et al. |
| 5,575,225 A | 11/1996 | Smith et al. |
| 5,915,312 A | 6/1999 | Meyer et al. |
| 5,979,343 A | 11/1999 | Gregor et al. |
| 6,164,222 A | 12/2000 | Mayerle et al. |
| 6,230,636 B1 | 5/2001 | Bom et al. |
| 6,253,693 B1 | 7/2001 | Mayerle et al. |
| 6,267,067 B1 | 7/2001 | Mayerle et al. |
| 6,283,679 B1 | 9/2001 | Gregor et al. |

(Continued)

OTHER PUBLICATIONS

U.S. Appl. No. 10/281,974, filed Dec. 4, 2002.

(Continued)

*Primary Examiner*—Gene Crawford
*Assistant Examiner*—William R Harp
(74) *Attorney, Agent, or Firm*—Rebecca Henkel (57) ABSTRACT

The inductor assembly of the present invention is configured with an agricultural implement to enhance conveyance of product from a storage hopper to a remote location. The inductor assembly includes an inductor chamber that defines an interior cavity configured to receive the supply of product from the storage hopper, an inlet tube configured to direct the stream of pressurized air so as to generate a combined stream of pressurized air and product, and an outlet tube configured to pass the combined stream of pressurized air and product from the inductor chamber to a distribution system application of the product in an agricultural environment. The improved inductor assembly can further include a selectively extendable outlet tube assembly, a trajectory control assembly coupled to the inlet tube, and an adjustable cover assembly configured to regulate agitation of the product and to purge deposits downstream of the inductor assembly.

1 Claim, 8 Drawing Sheets

U.S. PATENT DOCUMENTS

| | | |
|---|---|---|
| 6,289,830 B2 | 9/2001 | Mayerle et al. |
| 6,298,797 B1 | 10/2001 | Mayerle et al. |
| 6,609,468 B1 | 8/2003 | Meyer et al. |
| 6,644,225 B2 | 11/2003 | Keaton |
| 7,093,547 B2 * | 8/2006 | Mayerle ..................... 111/174 |
| 7,213,525 B2 * | 5/2007 | Meyer et al. ................ 111/174 |
| 7,258,070 B2 * | 8/2007 | Mayerle ..................... 111/174 |
| 7,267,061 B2 * | 9/2007 | Mayerle ..................... 111/174 |
| 7,387,078 B2 * | 6/2008 | Mayerle ..................... 111/174 |
| 2001/0013309 A1 | 8/2001 | Mayerle et al. |
| 2003/0177967 A1 | 9/2003 | Lee et al. |

OTHER PUBLICATIONS

U.S. Appl. No. 10/409,664, filed Jan. 28, 2003.
John Deere Pamphlet (Sep. 2002).

\* cited by examiner

OPPOSED INDUCTOR IMPROVEMENTS

CROSS REFERENCE TO RELATED APPLICATIONS

This patent application is a Divisional of, and claims priority to under 35 U.S.C. §120, U.S. patent application Ser. No. 11/456,319, filed on Jul. 6, 2006, entitled, "Opposed Inductor Improvements" and having Dean Mayerle as the Inventor. The full disclosure of U.S. patent application Ser. No. 11/456,319 is hereby fully incorporated by reference. The patent application Ser. No. 11/456,319 was a Divisional of now granted U.S. Pat. No. 7,093,547, filed on Feb. 5, 2004 and granted on Aug. 22, 2006 entitled, "Opposed Inductor Improvements" and having Dean Mayerle as the Applicant.

BACKGROUND OF THE INVENTION

1. Field of the Invention

The invention relates to an implement for conveying products in an agricultural environment and, more particularly, relates to an improved nurse inductor assembly for conveying feed seed and other particulate material to a planting mechanism for application in an agricultural environment.

2. Discussion of the Related Art

In recent years, product delivery systems have been employed in agricultural implements to deliver seed, fertilizer and herbicides to planters and tool bars. As the size of agricultural implements continues to grow, the versatility of such implements becomes more significant. Large air carts or air seeders have become increasingly popular for planting seeds, fertilizer and other product without strict regard for the exact placement of the product. Typically, these large air carts are used for dry land farming (e.g., cereal crops, etc.).

For certain crop planting applications that require row crop planting or seed singulation (e.g., corn, soybean, etc.), the air cart can be combined with a nurse inductor assembly adapted to feed seed or other product from a larger storage hopper into smaller reservoirs located at on-row singulators or receivers. The combined air cart and nurse inductor assembly enables a farmer to singulate planting of seeds on-row from one central hopper filling location. Thereby, the combined nurse inductor assembly and air cart allows a farmer to plant more acreage before having to stop to fill the central hopper again, resulting in quicker planting and less labor while maintaining the precision spacing available by on-row singulation.

Figure 14:
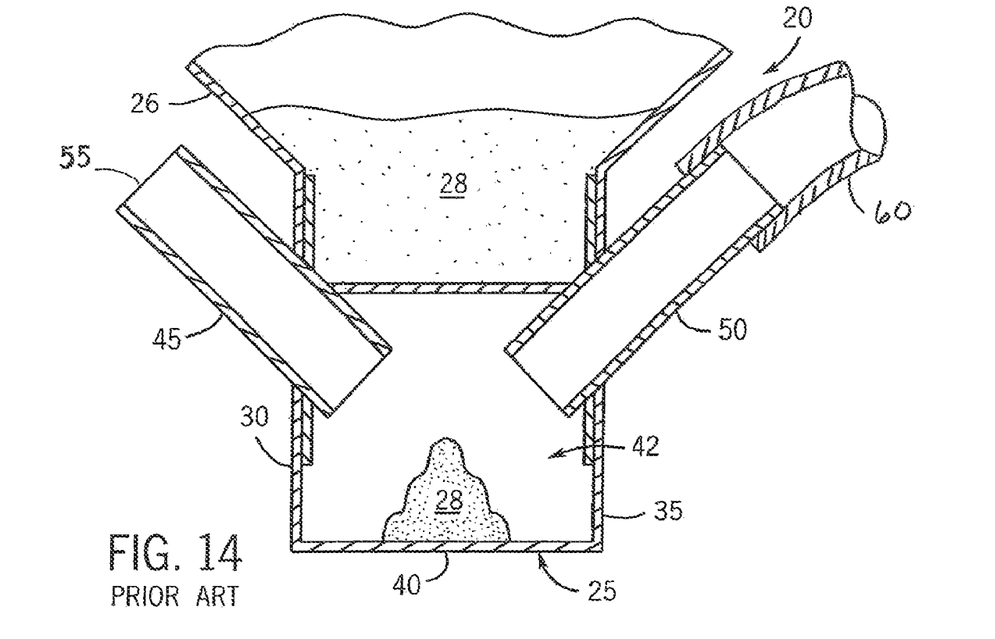
FIG. 14 schematically illustrates a cross-sectional view of an inductor assembly of the prior art.

FIG. 14 illustrates a nurse inductor assembly 20 known in the art. The known inductor assembly 20 includes an inductor chamber 25 positioned below a main feed hopper 26 of seed product 28. The inductor chamber 25 includes forward and rearward walls 30 and 35, respectively, and a bottom wall 40 that define an interior cavity 42 therebetween. The assembly 20 further includes an inlet tube 45 that extends through the forward wall 30. The inlet tube 45 is angled relative to the forward wall 30 in a downward direction toward the bottom wall 40. The assembly 20 further includes an outlet tube 50 that extends through the rearward wall 35. The outlet tube 50 is angled with respect to the rearward wall 35 in an upward direction from the bottom wall 40. The diameter of the inlet tube 45 is shown equal to the diameter of the outlet tube 50. The cross-sectional areas of the inlet and outlet tubes 45 and 50 are uniform throughout their lengths.

The interior cavity 42 is configured to receive a supply of seed product from the main feed hopper 26. A known pressurized or forced air system (not shown) provides a stream of forced air to an inlet end 55 of the inlet tube 45. The inlet tube 45 is configured to direct the stream of forced air in a direction toward the seed particulates so as to agitate and entrain the seed particulates into the air stream. The outlet tube 50 is configured to pass the stream of forced air and entrained seed particulates from the inductor assembly 20 to a seed distribution system. The seed distribution system generally includes one or more distribution lines 60 operable to route or direct the stream of air and entrained product toward one or more receivers or singulators. The receivers are configured to perform on-row planting of the seed product to an agricultural field. Each receiver generally includes one or more metering unit bins or mini-hoppers located on top of a respective seed metering unit and an injector configured to uniformly apply the seed into a furrow in the ground.

The nurse inductor assembly 20 induces seed product into the air stream when and where there is demand for the product at the receiver. The demand for product is controlled by the level of product in each respective receiver on the output end of the seed distribution line. In a known manner, the flow of air in the combined stream of air and entrained seed product escapes out an air vent at the receiver. The remaining suspended seed product drops under gravity into one or more mini-hoppers or meter bins, and is then applied precisely into a furrow in the ground. The receiver is designed to allow air from the combined stream of air and entrained product to escape when the seed particle level is well below the air vent, but to limit the amount of air to escape as the seed particle level approaches the air vent. A filled receiver prevents the escape of air, thereby reducing the capacity of the air flow through the inductor assembly 20 to induce the seed product into the distribution line. If the nurse inductor assembly 20 includes a plurality of outlet tubes 50, the flow of air will to go to the distribution lines that have open receivers that exhibit less air flow resistance. As the seed product passes through the meter and is planted, the seed pile shrinks in the receiver or mini-hopper until the end of the distribution line is uncovered. At that point, the stream of air and seed product resumes through the distribution line, and the seed pile in the mini-hopper is replenished.

The certain known nurse inductor assembly described above has several drawbacks. For example, the velocity of the combined stream of air and seed product through the distribution line 60 slows as the stream encounters the increased resistance associated with traveling through the deposited seed product at the receiver. Seed product allowed to be induced into the distribution lines below the minimum carrying velocity causes blocking of the seed distribution lines 60. Any seed product that had been entrained into the slower flowing air stream drops out under the force of gravity. A certain quantity of this seed product will fall back into the interior cavity 42 of the inductor chamber 25. The remaining quantity of dropped seed product will deposit toward low points in the distribution lines, increasing plugging opportunities.

In another example, FIG. 14 shows the certain known inductor assembly 20 having the inlet tube 45 and the outlet tube 50 opposed to one another and of the same cross-sectional area. The distribution line 60 typically attaches over the outside surface of the outlet tube 50, and therefore a cross-sectional area of the distribution line is greater than a cross-sectional area of the outlet tube 50. This geometry of the known inductor assembly 20 further enhances inducement of seed product into the distribution lines 60 at or below the product's minimum carrying air velocity. The inducement of seed product below the minimum carrying velocity enhances plugging at or near the inductor and/or in the distribution lines 60. This problematic plugging can be intensified by other additional variables—e.g., hillsides, humidity, longer delivery lines on larger machines, system air loss, etc. Furthermore, this known inductor geometry causes seed product and particulates to be deposited in the distribution lines following shutting off the air pressure from the air pressure source. As the air pressure drops, known inductor assemblies continue to pick-up seed product and particulates until the air velocity drops below the minimum carrying velocity. As a result, seed product drops out of the air stream and settles down at low points in the distribution lines. Depending on the delivery rate and the air pressure shutoff speed, known inductor systems cause a significant amount of seed product to be deposited in the distribution lines, causing plugging and inhibiting planting operation. Therefore, it is critical for known systems to have flat distribution lines.

Furthermore, certain known nurse inductor assemblies do not provide for an efficient method to clean-out or purge deposits of seed product in the nurse distribution system. To clean-out certain known distribution systems, an operator must empty the meter bins and/or mini-hoppers first, then empty the main storage hopper, purge the distribution lines, and empty the mini-hoppers again. This clean-out process is cumbersome and very time-consuming. Furthermore, certain known nurse inductor assemblies do not provide a means for regulating the flow of seed product in the distribution lines other than by adjusting the speed of a blower fan. Variable speed adjustment of the fan is not equally efficient for a wide range of seed product types and variable sizes.

Therefore, a need has arisen to provide an improved nurse inductor assembly and an improved method of forced air conveying seed product that provide sufficient carrying velocity before the seed product enters a distribution line. The need has also arisen to provide an improved method of regulating an induction rate of seed product conveyed in a nurse distribution system. The need has also arisen to provide an improved method of cleaning-out or flushing seed product deposited in a distribution line of a nurse distribution system. The need has also arisen for an improved method of selectively directing the trajectory of air into the inductor assembly for entrainment of seed product into an air stream for conveyance in a distribution line of a nurse distribution system. The need therefore has arisen to provide a simple, reliable, durable, and efficient system for conveying product in an agricultural setting or environment.

SUMMARY OF THE INVENTION

The present invention provides an improved inductor assembly for generating a stream of pressured air and product for distribution by an agricultural implement. The inductor assembly includes an inductor chamber that defines an interior cavity configured to receive a supply of product. The inductor assembly further includes an inlet tube and an outlet tube. The inlet tube is configured to discharge a stream of pressurized air toward a supply of product in the interior cavity of the inductor chamber. The stream of pressurized air engages the supply of product so as to generate a combined stream of pressurized air and product. The outlet tube is disposed opposite the inlet tube and is configured to pass the combined stream of air and product from the inductor chamber.

In a first embodiment of the present invention, a cross-sectional area of a first or inlet end of the outlet tube is greater than a cross-sectional area of a second or outlet end the outlet tube. This configuration ensures that the stream of product in the outlet tube has sufficient carrying velocity before entering an attached distribution line for conveyance to the remote location.

In another embodiment, the inductor assembly of the present invention includes a trajectory control assembly configured to selectively direct the pressurized air stream into the interior cavity of inductor chamber.

In yet another embodiment, the inductor assembly of the present invention includes an adjustable outlet tube assembly having an adjustable outlet tube selectively extendable into the interior cavity of the inductor chamber. A cross-sectional area of an inlet end of the adjustable outlet tube is greater than a cross-sectional area of the outlet end of the adjustable outlet tube, in a manner similar to the first preferred embodiment of the inductor assembly.

In yet another embodiment, the inductor assembly of the present invention includes a cover assembly having a cover and a pair of flap members configured to selectively regulate the discharge air to the outlet tube. In one position, the flap members are configured to prevent the product from entering the outlet tube while simultaneously directing the pressurized air from the inlet tube toward the outlet tube to purge deposits of product in and downstream of the outlet tube.

The present invention also provides an improved product conveyance system for distributing a supply of product from a hopper to a remotely located distribution system. The system includes a source of air pressure operable to generate a stream of forced air, and a distribution system configured for applying product in an agricultural environment. The product conveyance further includes an inductor assembly configured to provide a combined stream of air and product to the distribution system. The inductor assembly includes an inductor chamber, an inlet tube, and an outlet tube. The inductor chamber includes an forward sidewall, a rearward sidewall, and a bottom that define an interior cavity therebetween configured to receive the supply of product. The inlet tube extends through the forward sidewall is configured to provide the supply of air in a substantially downward direction into the interior cavity of the inductor chamber and agitate the supply of product to generate the combined stream of air and product. The outlet tube extends through the rearward sidewall and is configured to pass the combined stream of air and product from the inductor chamber. A cross-sectional area of the outlet tube is larger than a cross-sectional area of the inlet tube. This aspect ensures that the stream of product in the outlet tube has sufficient carrying velocity before the product enters the outlet tube.

In another embodiment, the product conveyance system of the present invention includes a trajectory control assembly configured to selectively direct the pressurized air stream into the interior cavity of the inductor chamber.

In yet another embodiment, the product conveyance system of the present invention includes an adjustable outlet assembly having an adjustable outlet tube movable to be selectively positioned in the interior cavity. A cross-sectional area of an inlet end of the adjustable outlet tube includes a cross-sectional area greater than a cross-sectional area of an outlet end of the adjustable outlet tube, in a manner similar to the first embodiment of the product conveyance system.

In yet another embodiment, the product conveyance system of the present invention includes an inductor assembly having an adjustable cover assembly with a cover and a pair of flap members configured to selectively regulate the discharge air to the inductor chamber. In one position, the flap members are configured to prevent the product from entering the outlet tube by allowing the pressurized air from the inlet to travel directly to the outlet tube so as to clean out or purge product deposited in and downstream of the outlet tube.

Furthermore, the present invention provides a method of generating a stream of pressurized air and product generated with an inductor assembly having an inlet and outlet for conveyance to a remote location. The method includes the acts of purging product deposited in and downstream of the outlet of the inductor assembly toward the remote location, and preventing product from entering the outlet tube during the act of purging of the deposits of product.

The present invention also provides another method of conveying product from a hopper to a remote location with forced air in an agricultural environment. The method includes the act of providing a nurse inductor assembly configured to generate a combined stream of air and entrained product. The assembly includes a chamber operable to receive the product from the hopper, and an outlet tube operable to communicate the stream of pressurized air and product from the inductor assembly for conveyance to the remote location. The method further includes the acts of providing a trajectory control assembly configured to receive the pressurized air stream, and rotating the trajectory control assembly to selectively direct the stream of pressurized air into the inductor chamber.

The present invention also provides another method of conveying a product from a hopper to a remote location with forced air. The method includes the act of providing a nurse inductor assembly configured to generate a combined stream of air and entrained product. The nurse inductor assembly includes a chamber operable to receive the product from the hopper, and an inlet tube operable to receive stream of pressurized air. The method further includes the acts of providing an adjustable outlet assembly operable to communicate the stream of pressurized air and product from the inductor assembly for transport to the remote location, and moving the adjustable outlet assembly inward or outward with respect to the product in the inductor chamber.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

A wide variety of inductor assemblies for conveying product could be constructed in accordance with the invention defined by the claims. Hence, while preferred embodiments of the invention will now be described with reference to a seed product conveyed by an air cart, it should be understood that the invention is in no way so limited. The type of forced air conveying apparatus or machine (e.g., spreader, etc.) can vary. While the description refers to use of the present invention to convey seed product, the invention can be utilized to convey a wide variety of product (e.g., seed, fertilizer, herbicide, pesticide, etc.) and is not limiting on the invention. In addition, the type and size of the seed product (e.g., soybean, corn, cereal grains, etc.) can vary.

1. System Overview

Figure 1:
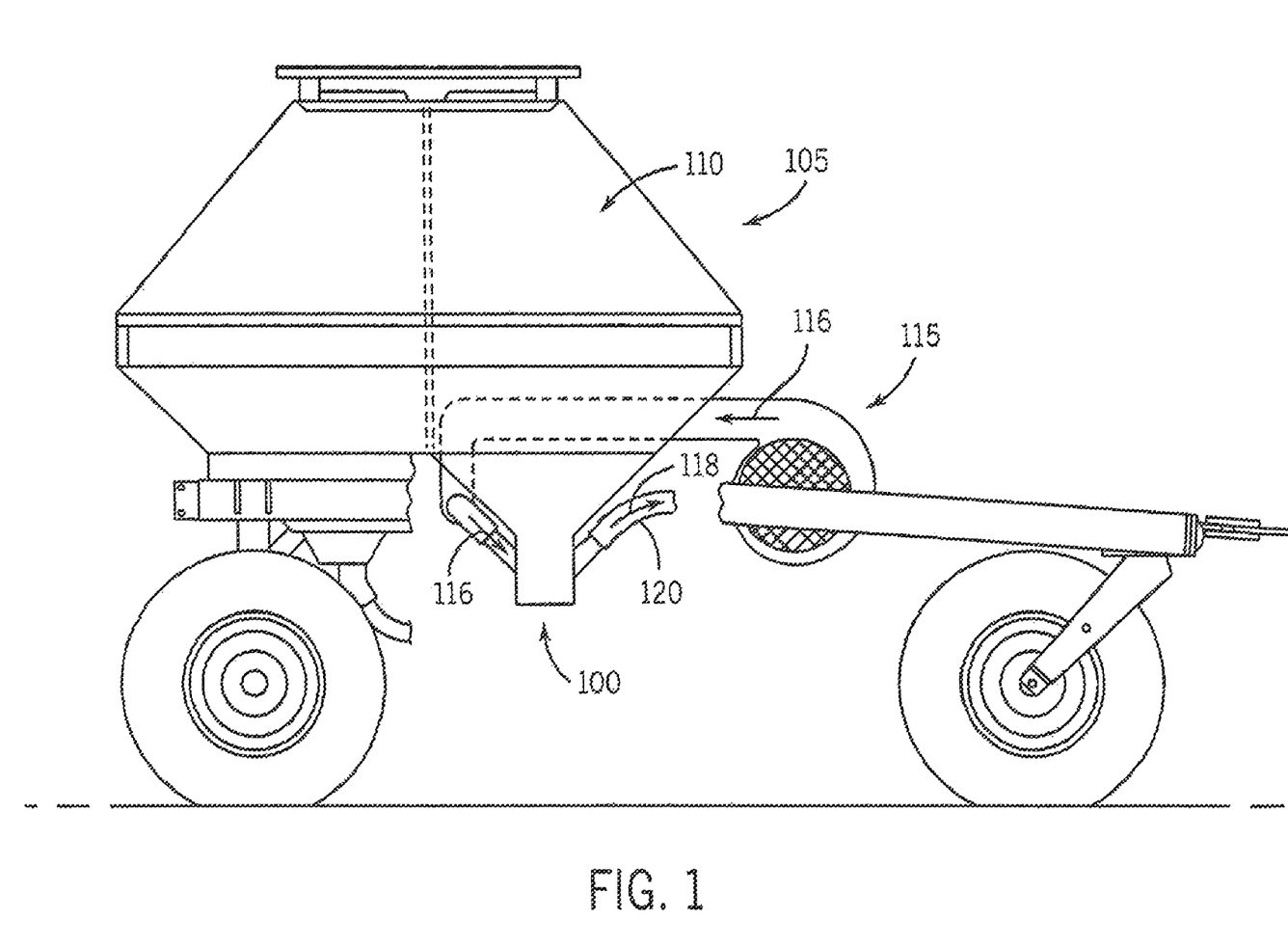
FIG. 1 schematically illustrates a side elevation view of an agricultural implement in accordance with the present invention.
Figure 2:
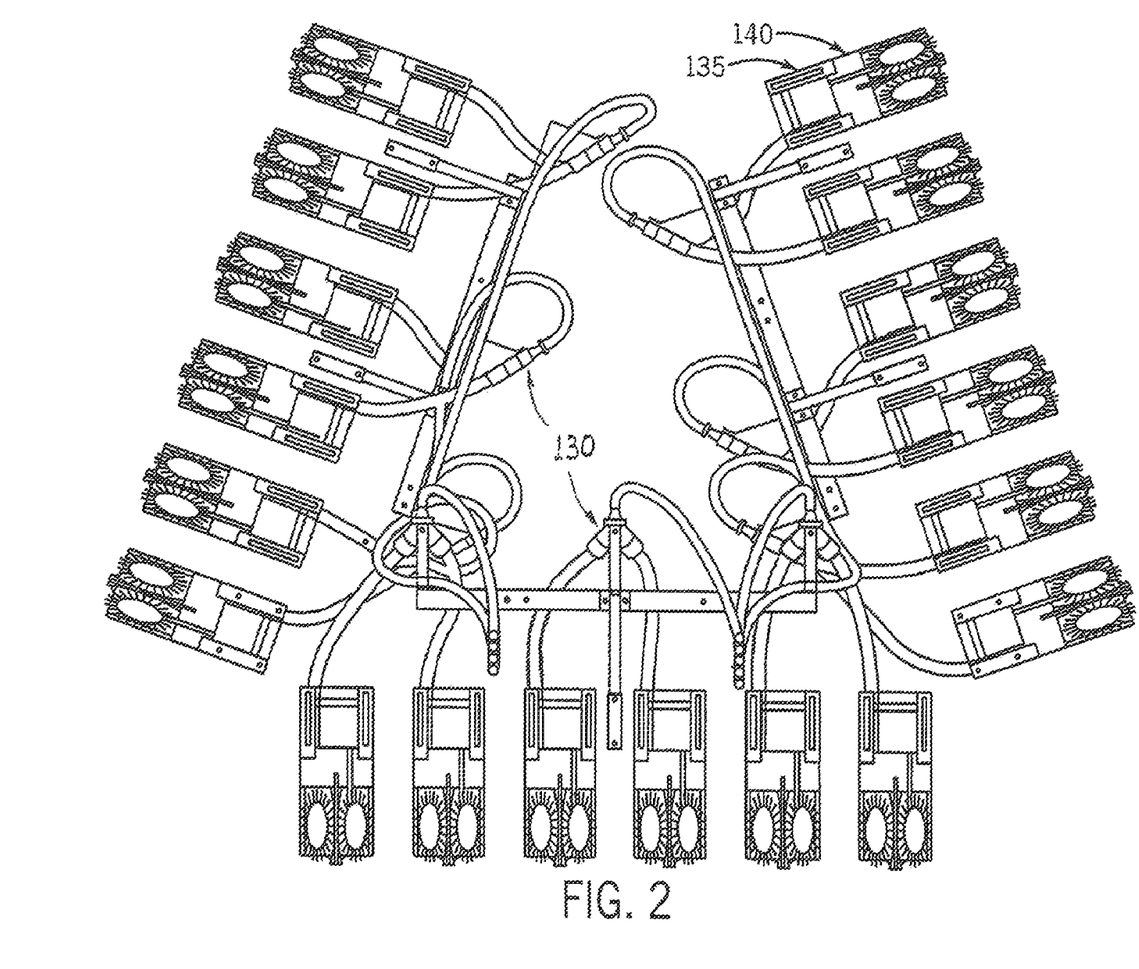
FIG. 2 schematically illustrates a front view of a seeder in accordance with the present invention.
Figure 3:
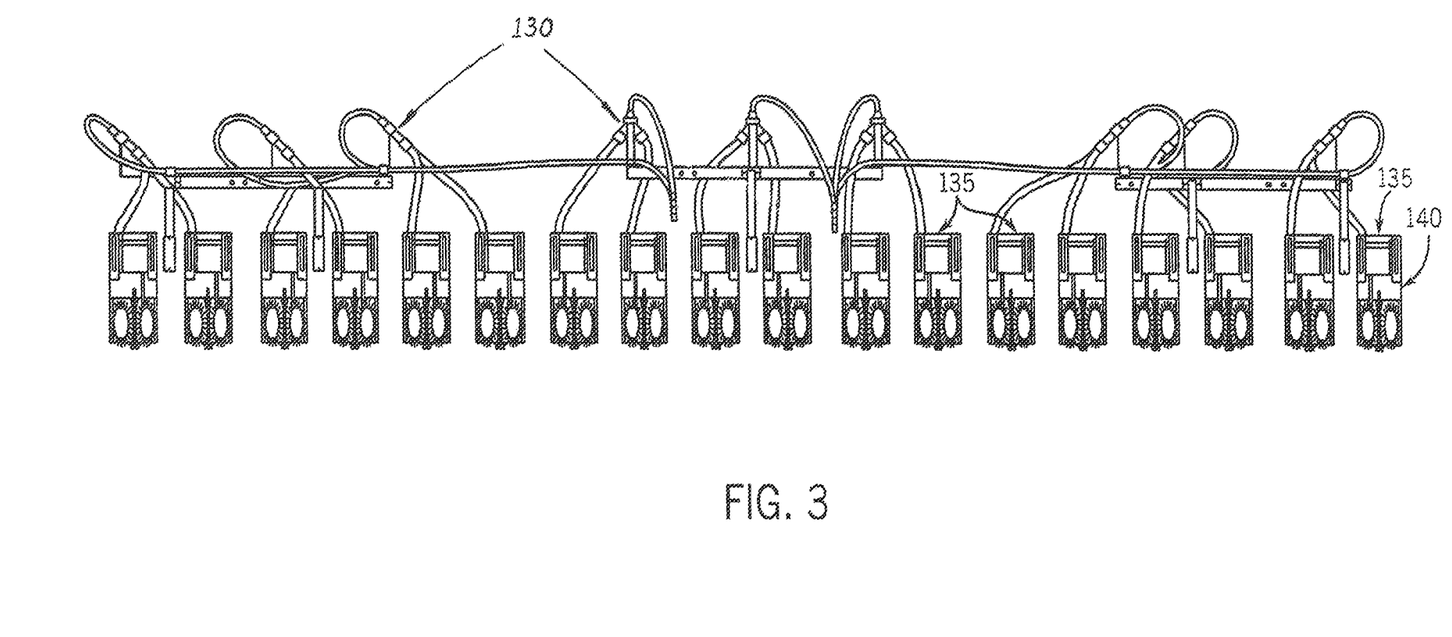
FIG. 3 schematically illustrates a front view of the seeder of FIG. 2 in an operative position.

Referring to FIGS. 1-3, an improved nurse inductor assembly 100 in accordance with a first embodiment of the present invention is combined with an agricultural implement. The preferred agricultural implement shown is a conventional air cart 105.

The air cart 105 generally includes a main or central hopper 110, and a pressurized or forced air source 115. The forced air source 115 (e.g., blower fan) is operable to provide a stream of pressurized air to the inductor assembly 100. The hopper 110 includes a regulator (not shown) operable to permit more or less seed product to pass from the hopper 110 into the inductor assembly 100. The disposition of the falling seed product into the inductor assembly 100 is influenced by the type of seed product, because the properties (e.g., size, shape, weight, etc.) of the seed product affect how easily the air stream picks the product up. Furthermore, the difference in the angle of repose of the surface of a pile of the seed product will vary with the type of seed product being distributed.

The inductor assembly 100 is configured to engage the stream of forced air shown by arrow 116 provided from the forced air source 115 with the seed product fed from the central hopper 110. The forced air stream conveyed from the pressurized air source 115 to the inductor assembly 100 pressurizes the inductor assembly 100, as well as agitates the pile of seed product accumulating in the inductor assembly 100.

The inductor assembly 100 is generally configured to direct or guide the forced air stream into a path that tangentially engages the seed product dropped from the hopper 110 into the inductor assembly 100. The turbulence of the forced air stream agitates the accumulation of the seed product, separating and entraining the individual seed product into the air stream.

The forced air stream also creates a vacuum in the inductor assembly 100 such that the stream of pressurized air and entrained seed product shown by arrow 118 is swept toward and into one or more distribution lines 120 that lead to a receiver or mini-hopper 135. The nurse distribution system includes a receiver header 130 connected to one or more receivers 135. The individual seed product remains suspended or entrained in the air stream while passing through the distribution line 120 to the receiver 135. In a known manner, the air bleeds off through an air vent (not shown) at the receiver header 130, and the entrained individual seed product falls by gravity into a second pile or mass at the receiver 135. The receiver 135 is thereafter operable to singulate the seed product for application into a furrow in the ground.

The seed product in the inductor assembly 100 is suspended and carried away by the air stream only when the air stream velocity is above the minimum carrying velocity to entrain the seed product in the stream of air. An air stream velocity below the minimum carrying velocity will not entrain seed and therefore seed will drop out of the air stream and fall back to the pile inside the inductor chamber.

2. Inductor Assembly

Figure 4:
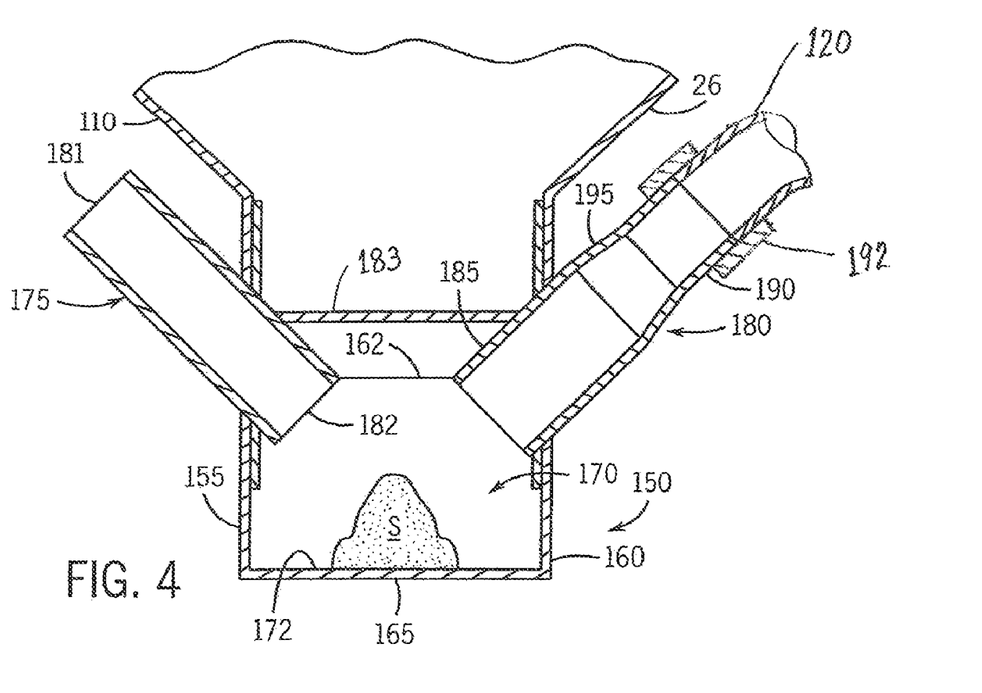
FIG. 4 schematically illustrates a cross-sectional view of a first embodiment of an inductor assembly in accordance with the present invention.
Figure 5:
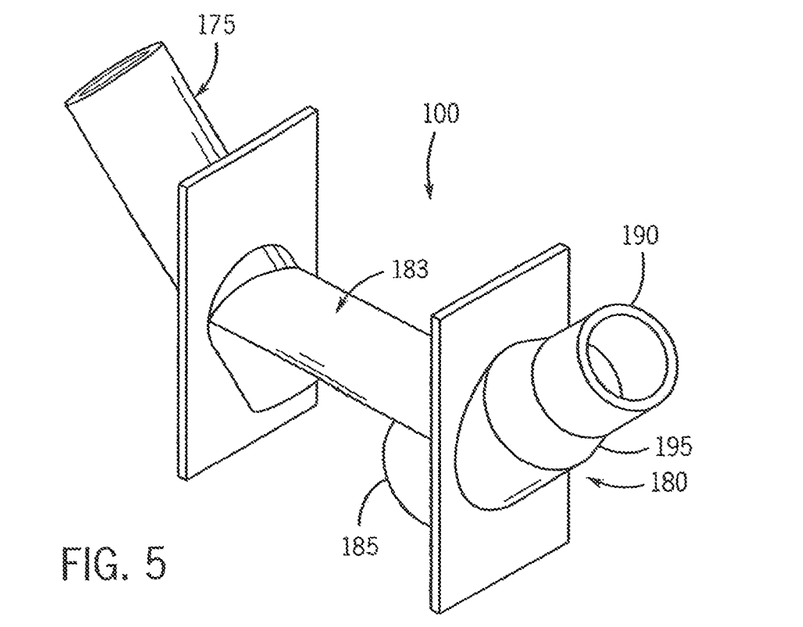
FIG. 5 schematically illustrates an isometric view of the inductor assembly shown in FIG. 4.

FIGS. 4 and 5 illustrate a detailed view of a first embodiment of the inductor assembly 100 of the present invention. The inductor assembly 100 includes an inductor chamber 150 disposed underneath and in communication with the main hopper 110 of the air cart 105. The seed product flows from the hopper 110 into the inductor chamber 150.

The inductor chamber 150 includes an upstream or forward wall 155, a downstream or rearward wall 160, and a bottom wall 165 configured to define an interior cavity 170 therebetween, similar to the known inductor assembly 20 of FIG. 14. The wall 165 includes an upper surface 172 configured to receive a pile of the seed product S from the hopper 110.

The chamber 150 further includes an inlet tube 175 extending through the forward wall 155, and an outlet tube 180 extending through the rearward wall 160. The inlet tube 175 includes an inlet end 181 configured to receive the pressurized stream of air from the pressurized air source 115. An outlet end 182 of the inlet tube 175 is disposed in the interior cavity 170 of the chamber 150 and configured to discharge the stream of pressurized air toward the supply or pile of seed product S in the chamber 150. The discharge of pressurized air from the inlet tube 175 agitates the pile of seed product S so as to generate a combined stream of pressurized air and seed product. The proximity of the inlet tube 175 and the outlet tube 180 through the forward and rearward walls 155 and 160, respectively, of the inductor chamber 150 affects the amount of seed product carried in the combined stream of pressurized air and seed product toward the distribution line 120.

A cover assembly 183 is disposed between the inlet and outlet tubes 175 and 180, respectively. The cover assembly 183 includes a cover 184 and is configured to enhance agitation of the pile of seed product S and to direct the combined stream of air and entrained seed product toward the outlet tube 180 by providing an air pathway between the inlet and outlet tubes 175 and 180, respectively.

The outlet tube 180 of the inductor assembly 100 is configured to discharge the combined stream of air and seed product from the inductor chamber 150. The outlet tube 180 includes an inlet end 185 disposed opposite the outlet end 182 of the inlet tube 175. The inlet end 185 of the outlet tube 180 includes an inside diameter or respective cross-sectional area that is greater than an inside diameter or respective cross-sectional area of an outlet end 190 of the outlet tube 180. The inside diameter or respective cross-sectional area of the inlet end 185 is also equal to or greater than an inside diameter or respective cross-sectional area of the distribution line 120 attached by a coupling 192 to the outlet end 190 of the outlet tube 180. The outlet tube 180 also includes a conical portion 195 that connects the inlet end 185 to the outlet end 190. The length and shape (e.g., linear, curvilinear, etc.) of the conical portion 195 can vary. The smaller cross-sectional area or inside diameter of the outlet end 190 of the outlet tube 180 allows the coupled distribution line 120 to have a smaller cross-sectional area or inside diameter relative to the cross-sectional area or inside diameter of the inlet end 185 of the outlet tube 180. The larger cross-sectional area or inside diameter of the inlet end 185 relative the outlet end 190 of the outlet tube 180 and the attached distribution line 120 prevents the combined stream of forced air and seed product passed into the outlet tube 180 and traveling through the attached distribution lines 120 from traveling below the minimum carrying velocity of the seed product. Furthermore, this improved inductor assembly 100 reduces the amount of seed product deposited in the distributions lines 120 when the forced air source 115 is shutdown. As a result, less seed product is left deposited in the distribution line 120 that could otherwise create plugging opportunities when the air cart 105 is re-started.

Figure 6:
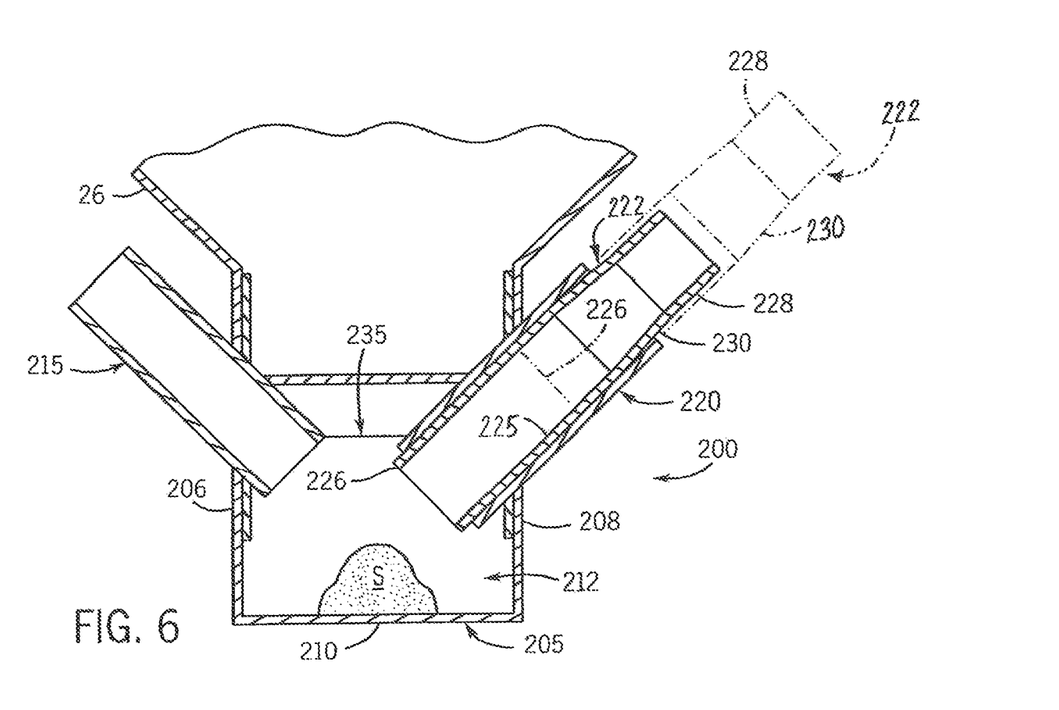
FIG. 6 schematically illustrates a cross-sectional view of a second embodiment of an inductor assembly in accordance with the present invention.

FIG. 6 illustrates a cross-sectional view of a second embodiment of an inductor assembly 200. The inductor assembly 200 includes an inductor chamber 205 having forward and rearward walls 206 and 208, respectively, and a bottom wall 210 that define an interior cavity 212, and inlet and outlet tubes 215 and 220, respectively, similar to the inductor assembly 100 described above. The inductor assembly 200 further includes an adjustable outlet assembly 222 coupled to the outlet tube 220. The adjustable outlet assembly 222 includes an adjustable outlet tube 225 disposed inside the outlet tube 220. The adjustable outlet tube 225 includes an inlet end 226 having a cross-sectional area greater than a cross-sectional area of an outlet end 228, and a conical section 230 therebetween similar to the outlet tube 180 described above. The adjustable outlet tube 225 is configured to slidably adjust such that the inlet end 226 can move inward and outward (shown in dashed line) relative to the interior cavity 212 of the inductor chamber 205. The outlet end 228 of the adjustable outlet tube 225 is configured to couple with the distribution line 120. A cover assembly 235 is disposed between the inlet and outlet tubes 215 and 220, respectively, similar to the cover assembly 183 described above.

Figure 7:
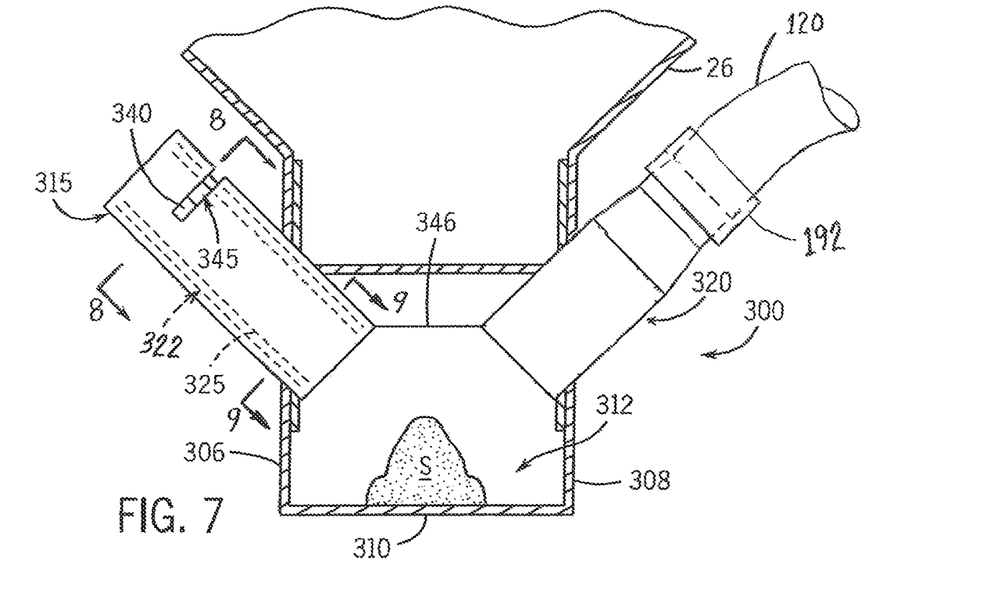
FIG. 7 schematically illustrates a cross-sectional view of a third embodiment of an inductor assembly in accordance with the present invention.
Figure 8:
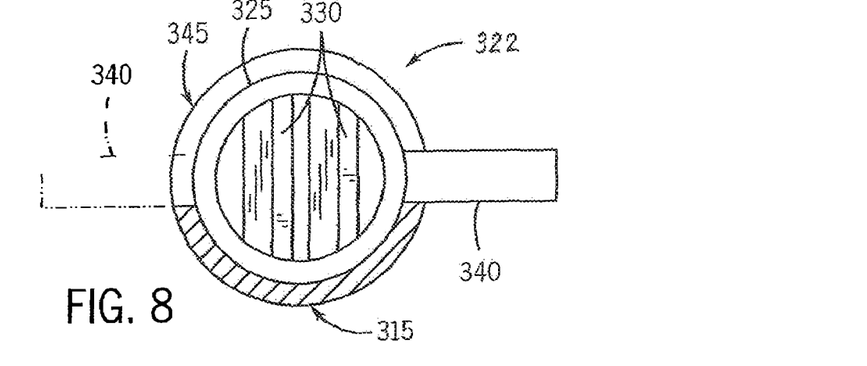
FIG. 8 schematically illustrates a cross-sectional view of the inductor assembly along line 8-8 in FIG. 7.

FIGS. 7 and 8 show a yet another embodiment of an inductor assembly 300 of the present invention. The inductor assembly 300 includes an inductor chamber 305 having a forward and rearward walls 306 and 308, respectively, and a bottom wall 310 that define an interior cavity 312, and inlet and outlet tubes 315 and 320, respectively, similar to the inductor assembly 100 described above. The outlet tube 320 is attached by coupling 192 to the distribution line 120 similar to the inductor assembly 100 described above.

Figure 9:
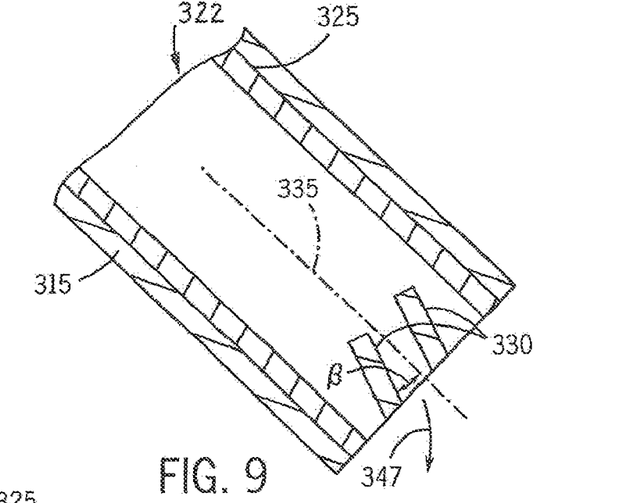
FIG. 9 schematically illustrates a cross-sectional view of the inductor assembly along line 9-9 in FIG. 7 in a first operative position.
Figure 10:
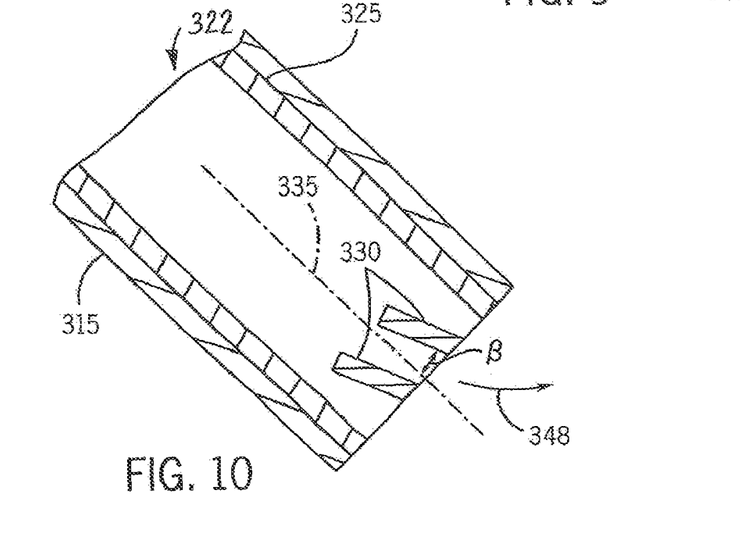
FIG. 10 schematically illustrates a cross-sectional view of the inductor assembly along line 9-9 in FIG. 7 in a second operative position.
Figure 11:
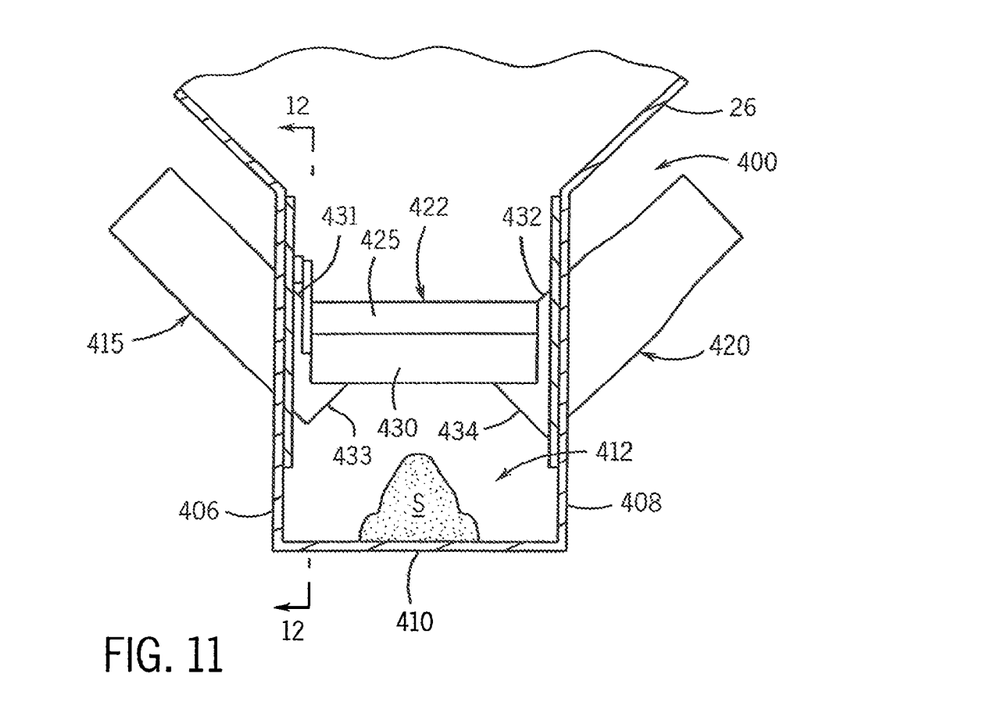
FIG. 11 schematically illustrates a third embodiment of an inductor assembly in accordance with the present invention.
Figure 12:
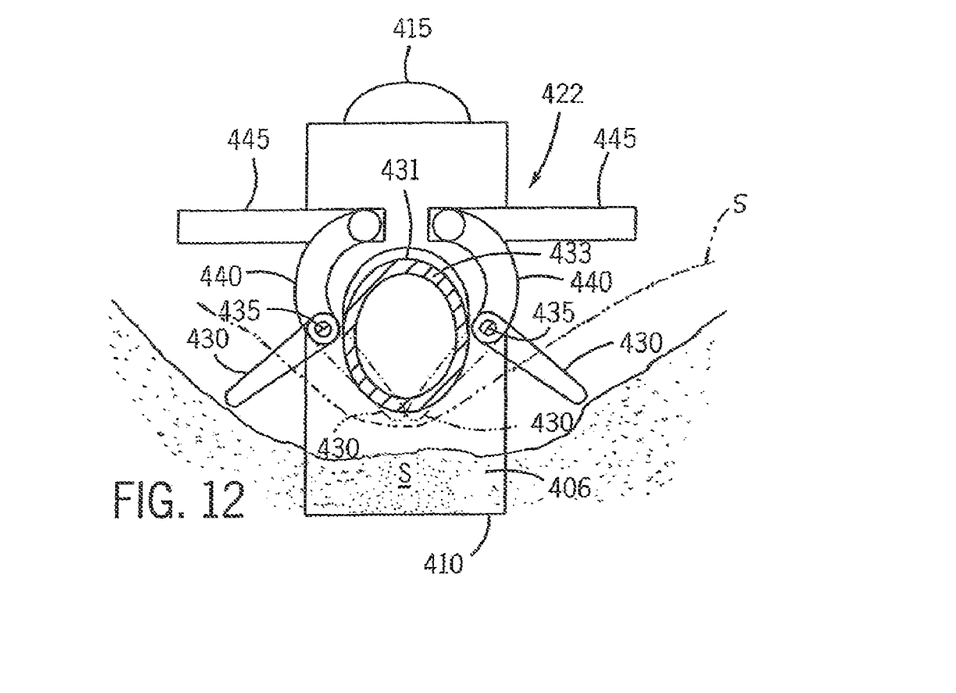
FIG. 12 schematically illustrates a cross-sectional view of the inductor assembly along line 12-12 in FIG. 11.
Figure 13:
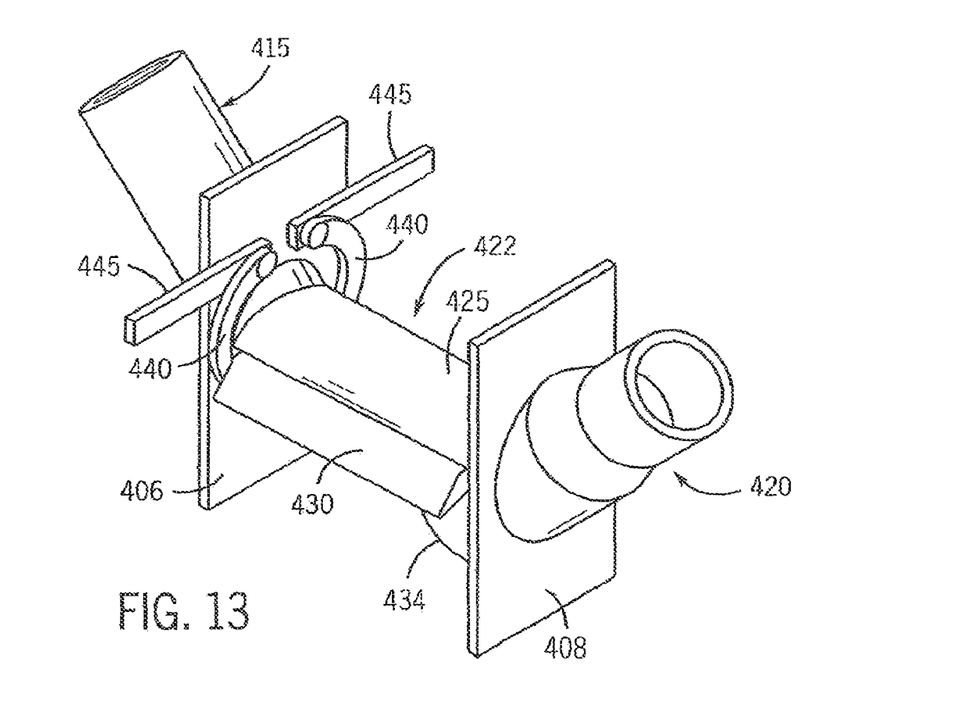
FIG. 13 schematically illustrates an isometric view of the inductor assembly shown in FIG. 11.

The inductor assembly 300 further includes a trajectory control assembly 322 coupled to the inlet tube 315. The trajectory control assembly is configured to selectively alter the trajectory of the forced air stream into the chamber 305. The trajectory control assembly 322 includes a trajectory tube 325 slidably coupled inside the inlet tube 315. As illustrated in FIGS. 9 and 10, the trajectory tube 325 includes a one or more deflectors or vanes 330 disposed at an angle (β) relative to a central axis 335 of the inlet tube 315 and the trajectory tube 325. The angle (β) of the deflector 330 is operative in directing the stream of forced air into the interior cavity 312 of the inductor chamber 305. The angle (β) of the deflector 330 preferably ranges between zero to ninety degrees. The trajectory tube 325 is slidably adjustable inside the inlet tube 315 such that the angle (β) of the deflectors 330 is operable in selectively varying the direction of the forced air stream discharged from the inlet tube 315 into the interior cavity 312 of the inductor chamber 305. The number, angle (β), and position (e.g., vertical, horizontal, staggered, aligned, etc.) of the deflectors 330 can vary. Furthermore, the size and shape (e.g., linear, curved, contoured, etc.) of the deflectors 330 can vary. The trajectory control assembly 322 further includes a handle 340 slidably adjustable to control the direction of the pressurized air stream into the interior cavity 312. The handle 340 is coupled to the trajectory tube 325 and disposed through a slot 345 in the inlet tube 315 to allow selective adjustment of the angle of the deflectors 330 relative to the central axis 335 of the inlet tube 315 and trajectory tube 325. The position and rotational range of motion of the handle 340 relative to the inlet tube 315 can vary. A cover assembly 346 is disposed between the inlet and outlet tubes 315 and 320, respectively, similar to the cover assembly 183 described above.

FIG. 8 illustrates the handle 340 positioned at first and a second position (shown in dashed line) illustrated by FIGS. 9 and 10 in regard to direction of the pressurized air from the inlet tube 315 into the interior cavity 312 of the inductor assembly 305. FIG. 9 shows a detailed view of the trajectory control assembly 322 in the first operative position where the deflectors 330 are configured to direct the pressurized air stream in a downward direction, shown by arrow 347, relative to a central axis 335 of the inlet tube 315. FIG. 10 shows the trajectory control assembly 322 in the second operative position where the deflectors 330 are configured to direct the pressurized air stream in an upward direction, shown by arrow 348, relative to the inlet tube's central axis 335. Although FIGS. 9 and 10 illustrate direction of the pressurized air stream in an upward or downward direction, the trajectory control assembly 322 is operable to direct the pressurized air stream in any direction (e.g., left, right, etc.). The trajectory control assembly 322 can be adjusted to selectively control the flow of seed toward the outlet tube 320. In a first position, the trajectory control assembly 322 diverts the force air stream in an upward direction to selectively reduce the flow of seed product toward the outlet tube and/or to purge or clean-out deposits of seed product at or downstream of the outlet tube 320. In a second position, the trajectory control assembly 322 diverts the forced air stream in a downward direction to enhance the entrainment and flow of seed product toward the outlet tube 320.

FIG. 11 shows a fourth embodiment of an inductor assembly 400 of the invention. The inductor assembly 400 includes an inductor chamber 405 having a forward and rearward walls 406 and 408, respectively, and a bottom wall 410 that defines an interior cavity 412 therebetween, and inlet and outlet tubes 415 and 420, respectively, similar to the inductor assembly 100 described above. The inductor assembly 400 further includes an adjustable cover assembly 422 disposed between the inlet and outlet tubes 415 and 420, respectively. The adjustable cover assembly 422 includes a cover 425 connected on each side by a flap member 430. The cover 425 is generally aligned with upper portions 431 and 432 of an outlet end 433 of the inlet tube 415 and an inlet end 434 of the outlet tube 420, respectively. Each flap member 430 is generally linear-shaped and pivotal about each side of the cover 425. The flap member 430 is preferably pivotal over a desired range of forty-five degrees, but the range can vary. The size and shape of the cover 425 and the flap members 430 (e.g., linear, contoured, curved, angled, etc.) can vary to conform to the general profile of the outlet end 433 of the inlet tube 415 and the inlet end 434 of the outlet tube 420. The composition (e.g., metallic, plastic, etc.) of the cover 425 and the flap members 430 can also vary.

Each of the flap members 430 is pivotally coupled by a pivot 435 to a linkage 440 connected to a control lever 445. The control lever 445 is operable via each linkage 440 to selectively move the flap member 430 inward or outward to selectively regulate the direction of forced air between the inlet and outlet tubes 415 and 420, respectively. Thereby, selective movement of the control lever 445 and adjustable cover assembly selectively regulates the proximity of the seed product relative to the agitation zone between the inlet and outlet tubes 415 and 420, respectively, and thereby controls the entrainment seed product and the flow of the stream of forced air and seed product toward the outlet tube. The control lever 445 can be coupled to selectively or simultaneously pivot a plurality of adjustable cover assemblies 422 of a plurality of inductor assemblies 400.

The flap member 430 is variably movable between a MAX OPEN and a CLOSED position (shown in dashed line). In the MAX OPEN position, the flap member 430 is extended outward to its widest position. In this MAX OPEN position, the adjustable cover assembly causes the pile of seed product S to sustain a maximum distance from an agitation zone of the force air. This is best for small product as it easily is induced into the air stream for discharge through the outlet tube 420. The flap members 430 are operable to pivot inward with respect to the cover 425, narrowing and confining the dispersal of the forced air stream discharged from the inlet tube 415. Narrowing dispersal of the forced air stream into the cavity 412 allows the height of the pile of seed product S to approach an agitation zone of the forced air near the inlet or outlet tubes 415 and 420, respectively, and enhances entrainment of larger, coarser seed product that would otherwise be more difficult to entrain into the forced air stream. In the CLOSED position as shown in dashed line in FIG. 12, the flap members 430 are completely pivoted inward such that the forced air stream is directed or steered toward the outlet tube 420 without engaging the pile of seed product S in the interior cavity 412 while simultaneously preventing seed product from entering the outlet tube 420. The CLOSED position of the flap members 430 also encloses the discharged air from the inlet tube 415 toward the outlet tube 420. Thereby, the CLOSED position of flap members 430 of the adjustable cover assembly 422 causes the forced air stream to pass directly through the inductor assembly 400 so as to clean out or purge deposits of seed and other materials in the outlet tube 420 and the downstream distribution lines 120. The purging aspect of the adjustable cover assembly 422 reduces plugging opportunities in the distribution lines 120 when the air cart 105 and distribution system are re-started. Furthermore, the adjustable cover assembly 422 allows the distribution lines 120 to be purged or cleaned-out without having to empty seed product stored in the central hopper 110. Thereby, the adjustable cover assembly 422 simplifies purging of the distribution lines 120 and distribution system. In contrast, certain known assemblies require emptying the central hopper to flush the distribution lines and distribution system.

The embodiments of the nurse inductor assembly 100, 200, 300, and 400 described above are described in combination with the standard air cart 105 having the central hopper and the pressurized air source. Although the above-description referred to an inductor assembly combined with an air cart 105, it is understood that the nurse inductor assembly 100, 200, 300, and 400 of the present invention is adaptable for use with a stand-alone blower and product storage tank, as well as adapted for incorporating with other types of agricultural implements mounted on a planter (e.g., no air cart). Furthermore, each of the above described embodiments of the inductor assembly of the invention can be constructed integrally with an air cart 105, or as a modular unit that can be coupled to a standard air cart structure to convert the air cart 105 into a nurse inductor type. The conventional pressurized air delivery tubes can be sealed and remain on the air cart 105, while the nurse inductor assembly is interposed to receive the pressurized air stream from the pressurized air source 115. A connector mechanism can facilitate the convenient connection of the nurse inductor assembly to the air cart 105 as a modular unit.

Furthermore, one skilled in the art will recognize that the present invention is not limited to the conveyance of seed product. The present invention can be used to convey numerous types of products (e.g., seed, fertilizer, herbicides, pesticides, etc.) that exhibit suitable properties for forced air conveyance. Furthermore, the typical air cart can be provided with multiple hoppers or tanks containing different types of products for application in an agricultural environment. For example, one tank could have seed product stored therein, while another tank would have fertilizer and yet another tank could have herbicides or still another reservoir of fertilizer. In such multi-tank configurations, one of the tanks could be provided with a nurse inductor assembly to convey seed product to the planting devices, while a conventional meter box is used to control the flow of fertilizer or other product to the planting devices by separate distribution tubes. Thereby, the forced air source on the air cart can be used for both fertilizing and nurse distribution operations simultaneously. Furthermore, the combined air cart and inductor assembly can be used to apply the fertilizer or other product at a variable rate controlled by an electronic controller, as is known for precision farming techniques. Other alternative configurations can include one nurse inductor assembly operable to convey seed product to all the receivers (e.g., singulator), as well as multiple nurse inductor assemblies operable to convey seed product to any one particular receiver.

Furthermore, one or more aspects and/or features of the embodiments of the inductor assemblies 100, 200, 300 and 400 described above can be combined and/or interchanged with other aspects and features of the inductor assemblies 100, 200, 300, and 400 and is not limiting on the invention.

Many changes and modifications could be made to the invention without departing from the spirit thereof. The scope of these changes will become apparent from the appended claims.

I claim:

1. A method of conveying product from a hopper with forced air to a remote location in an agricultural environment, the method comprising the acts of:

providing a nurse inductor assembly configured to generate a combined stream of air and entrained product, the assembly having a chamber operable to receive the product from the hopper, and an outlet tube operable to communicate the stream of pressurized air and product from the inductor assembly for conveyance to the remote location;

providing a trajectory control assembly configured to receive the pressurized air stream; and rotating the trajectory control assembly to selectively direct the stream of pressurized air into the inductor chamber.

* * * * *